United States Patent
Dudda et al.

(10) Patent No.: US 11,575,475 B2
(45) Date of Patent: Feb. 7, 2023

(54) METHODS AND DEVICES FOR RECEIPT STATUS REPORTING

(71) Applicant: Telefonaktiebolaget LM Ericsson (publ), Stockholm (SE)

(72) Inventors: Torsten Dudda, Wassenberg (DE); Mattias Bergström, Sollentuna (SE); Helka-Liina Määttanen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/365,638

(22) Filed: Jul. 1, 2021

(65) Prior Publication Data

US 2021/0399843 A1 Dec. 23, 2021

Related U.S. Application Data

(63) Continuation of application No. 15/544,763, filed as application No. PCT/EP2017/052332 on Feb. 3, 2017, now Pat. No. 11,070,324.

(Continued)

(51) Int. Cl.
*H04L 1/18* (2006.01)
*H04L 1/16* (2006.01)
(Continued)

(52) U.S. Cl.
CPC .......... *H04L 1/1851* (2013.01); *H04L 1/1614* (2013.01); *H04L 1/1628* (2013.01);
(Continued)

(58) Field of Classification Search
CPC ................ H04L 1/1851; H04L 1/1614; H04L 1/1685; H04L 1/1854; H04L 1/1628; H04L 47/34; H04W 24/10; H04W 28/0278
(Continued)

(56) References Cited

U.S. PATENT DOCUMENTS 7,903,578 B2 * 3/2011 Fischer ................. H04L 1/1635
    370/252
7,957,349 B2 * 6/2011 Kim ..................... H04W 36/02
    370/331
(Continued)

FOREIGN PATENT DOCUMENTS

CN    101978620 A    2/2011
CN    103718494 A    4/2014
(Continued)

OTHER PUBLICATIONS

Samsung, "Miscellaneous Corrections", 3GPP TSG-RAN WG1 #65, May 9-13, 2011, pp. 1-77, Barcelona, Spain, R1-111446.
(Continued)

*Primary Examiner* — John J Tabone, Jr.
(74) *Attorney, Agent, or Firm* — Coats & Bennett, PLLC

(57) ABSTRACT

A method of receipt status reporting in a communication device, comprising configuring (S1) said communication device for periodic receipt status reporting by associating a first status report type with a value of a first reporting periodicity parameter and associating a second status report type with a value of second reporting periodicity parameter, said first status report type being different from said second status report type and said first reporting periodicity parameter being different from said second reporting periodicity parameter, and periodically (S2) sending receipt status reports of said first type according to said associated value of said first reporting periodicity parameter and receipt status reports of said second type according to said associated value of said second reporting periodicity parameter.

20 Claims, 8 Drawing Sheets

Related U.S. Application Data

(60) Provisional application No. 62/291,686, filed on Feb. 5, 2016.

(51) Int. Cl.
  *H04L 47/34* (2022.01)
  *H04W 24/10* (2009.01)
  *H04W 28/02* (2009.01)

(52) U.S. Cl.
  CPC .......... *H04L 1/1685* (2013.01); *H04L 1/1854* (2013.01); *H04L 47/34* (2013.01); *H04W 24/10* (2013.01); *H04W 28/0278* (2013.01)

(58) Field of Classification Search
  USPC ................ 714/748, 712; 370/241, 315, 328; 455/423
  See application file for complete search history.

(56) References Cited

U.S. PATENT DOCUMENTS

| | | | |
|---|---|---|---|
| 8,355,331 B2 | 1/2013 | Chun et al. | |
| 8,369,854 B2* | 2/2013 | Peisa | H04W 36/26 370/347 |
| 9,491,648 B2 | 11/2016 | Choi et al. | |
| 9,860,797 B2* | 1/2018 | Basu Mallick | H04W 36/0027 |
| 9,961,581 B2* | 5/2018 | Bathwal | H04L 5/0055 |
| 10,897,333 B2 | 1/2021 | Zhang et al. | |
| 11,070,324 B2* | 7/2021 | Dudda | H04L 1/1628 |
| 2008/0069053 A1* | 3/2008 | Kim | H04W 36/02 370/332 |
| 2009/0181703 A1* | 7/2009 | Jiang | H04L 1/1854 455/466 |
| 2009/0196191 A1* | 8/2009 | Fischer | H04L 1/0031 370/252 |
| 2009/0196252 A1* | 8/2009 | Fischer | H04L 1/0031 370/328 |
| 2009/0207739 A1* | 8/2009 | Chun | H04L 1/1829 370/241 |
| 2010/0177733 A1* | 7/2010 | Yi | H04L 1/1685 370/331 |
| 2010/0216471 A1* | 8/2010 | Meyer | H04W 36/26 455/436 |
| 2012/0028631 A1* | 2/2012 | Chun | H04L 1/1635 455/422.1 |
| 2012/0224525 A1* | 9/2012 | Wang | H04W 36/18 370/328 |
| 2013/0034014 A1* | 2/2013 | Jonsson | H04W 24/10 370/253 |
| 2014/0169320 A1* | 6/2014 | Yi | H04W 64/00 370/329 |
| 2015/0146617 A1* | 5/2015 | Park | H04W 28/06 370/328 |
| 2015/0215827 A1 | 7/2015 | Zhang et al. | |
| 2016/0066362 A1* | 3/2016 | Ohta | H04W 40/22 370/331 |
| 2016/0127939 A1* | 5/2016 | Bathwal | H04W 24/10 370/252 |
| 2016/0183221 A1* | 6/2016 | Yi | H04L 1/1841 370/329 |
| 2016/0212661 A1* | 7/2016 | Basu Mallick | H04W 36/0027 |
| 2016/0234714 A1* | 8/2016 | Basu Mallick | H04W 16/32 |
| 2016/0374036 A1 | 12/2016 | Wang et al. | |
| 2017/0012887 A1* | 1/2017 | Ohta | H04L 43/08 |
| 2017/0041767 A1* | 2/2017 | Vajapeyam | H04W 72/04 |
| 2017/0064768 A1* | 3/2017 | Lee | H04W 8/22 |
| 2017/0251403 A1* | 8/2017 | Yi | H04W 24/10 |
| 2017/0289841 A1* | 10/2017 | Koskinen | H04L 47/34 |
| 2018/0102878 A1* | 4/2018 | Dudda | H04W 28/0278 |
| 2018/0139030 A1* | 5/2018 | Kim | H04L 5/0053 |
| 2018/0198566 A1* | 7/2018 | Yi | H04L 1/1642 |
| 2018/0206167 A1* | 7/2018 | Jactat | H04W 28/08 |
| 2018/0213439 A1* | 7/2018 | Uchino | H04L 1/1628 |
| 2018/0241509 A1* | 8/2018 | Phuyal | H04L 1/1614 |
| 2018/0262950 A1* | 9/2018 | Malkamäki | H04L 1/1621 |
| 2021/0399843 A1* | 12/2021 | Dudda | H04L 1/1854 |

FOREIGN PATENT DOCUMENTS

| | | |
|---|---|---|
| CN | 104812000 A | 7/2015 |
| JP | 2012533960 A | 12/2012 |
| JP | 2015082747 A | 4/2015 |
| RU | 2014108325 A | 9/2015 |
| WO | 2013048049 A1 | 4/2013 |

OTHER PUBLICATIONS

Intel Corporation et al., "Way forward on UE feedback for LWA", 3GPP TSG-RAN2 Meeting #92, Anaheim, US, Nov. 16-20, 2015, pp. 1-2, R2-157132, 3GPP.

Intel Corporation et al., "UE feedback for LTE-WLAN Radio Level Integration and Interworking Enhancement", 3GPP TSG-RAN2 Meeting #92, Anaheim, US, Nov. 16-20, 2015, pp. 1-3, R2-156739, 3GPP.

3rd Generation Partnership Project, "3rd Generation Partnership Project; Technical Specification Group Radio Access Network; Evolved Universal Terrestrial Radio Access (E-UTRA); Packet Data Convergence Protocol (PDCP) specification (Release 13)", Technical Specification, 3GPP TS 36.323 V13.0.0 (Dec. 2015), pp. 1-36, 3GPP.

Intel Corporation, "Introducing LWA PDCP status report", 3GPP TSG-RAN2 Meeting 92, Anaheim, US, Nov. 16-20, 2015, pp. 1-4, R2-156968, 3GPP.

Intel Corporation, Revised WID: LTE-WLAN Radio Level Integration and Interworking Enhancement, 3GPP TSG RAN Meeting #68, Malmö, Sweden, Jun. 15-18, 2015, RP-151114, revision of RP-150510.

* cited by examiner

Fig. 7

PROVIDING TO A COMMUNICATION DEVICE A CONFIGURATION INFORMATION ELEMENT COMPRISING INFORMATION FOR ASSOCIATING A FIRST STATUS REPORT TYPE WITH A VALUE OF A FIRST REPORTING PERIODICITY PARAMETER AND ASSOCIATING A SECOND STATUS REPORT TYPE WITH A VALUE OF SECOND REPORTING PERIODICITY PARAMETER — W1

METHODS AND DEVICES FOR RECEIPT STATUS REPORTING

RELATED APPLICATIONS

The present application is a continuation of U.S. patent application Ser. No. 15/544,763, which was filed Jul. 19, 2017, which is a national stage application of PCT/EP2017/052332, which was filed Feb. 3, 2017, and claims benefit of U.S. Provisional Application No. 62/291,686, which was filed Feb. 5, 2016, the disclosures of each of which are incorporated herein by reference in their entirety.

TECHNICAL FIELD

The present application relates to the field of systems in which data units are sent from a sending device to a receiving device and in which the receiving device periodically sends receipt status reports to the sending device.

BACKGROUND

It is known to provide for the possibility of a data unit receiver to be configured to periodically send receipt status reports to the data unit sender. For example, in the context of so-called LTE-WLAN Aggregation, it has been proposed to be able to configure a User Equipment (UE) to send PDCP (Packet Data Convergence Protocol) status PDUs, which can also be referred to as control PDUs, periodically.

SUMMARY

The object of the invention is to provide an improved concept for sending receipt status reports.

According to an embodiment, a method of receipt status reporting in a communication device is proposed comprising configuring said communication device for periodic receipt status reporting by associating a first status report type with a value of a first reporting periodicity parameter and associating a second status report type with a value of second reporting periodicity parameter, said first status report type being different from said second status report type and said first reporting periodicity parameter being different from said second reporting periodicity parameter. The method can furthermore comprise periodically sending receipt status reports of said first type according to said associated value of said first reporting periodicity parameter and receipt status reports of said second type according to said associated value of said second reporting periodicity parameter.

According to another embodiment a method of configuring a communication device for periodic receipt status reporting is proposed, comprising providing to said communication device a configuration information element comprising information for associating a first status report type with a value of a first reporting periodicity parameter and associating a second status report type with a value of second reporting periodicity parameter, said first status report type being different from said second status report type and said first reporting periodicity parameter being different from said second reporting periodicity parameter.

According to a further embodiment, a method of operating a node of a communication network is proposed, comprising providing to a communication device of said communication network a configuration information element comprising information for associating a first status report type with a value of a first reporting periodicity parameter and associating a second status report type with a value of second reporting periodicity parameter, said first status report type being different from said second status report type and said first reporting periodicity parameter being different from said second reporting periodicity parameter.

According to a further embodiment a communication device is proposed that is arranged for receiving data units and being configurable for periodic receipt status reporting by associating a first status report type with a value of a first reporting periodicity parameter and associating a second status report type with a value of second reporting periodicity parameter, said first status report type being different from said second status report type and said first reporting periodicity parameter being different from said second reporting periodicity parameter.

According to a further embodiment a node of a communication network is proposed, said node being arranged for providing to a communication device of said communication network a configuration information element comprising information for associating a first status report type with a value of a first reporting periodicity parameter and associating a second status report type with a value of second reporting periodicity parameter, said first status report type being different from said second status report type and said first reporting periodicity parameter being different from said second reporting periodicity parameter.

BRIEF DESCRIPTION OF THE DRAWINGS

FIG. 7 shows a fifth embodiment of a method step according to the present disclosure.

DETAILED DESCRIPTION

Figure 1:
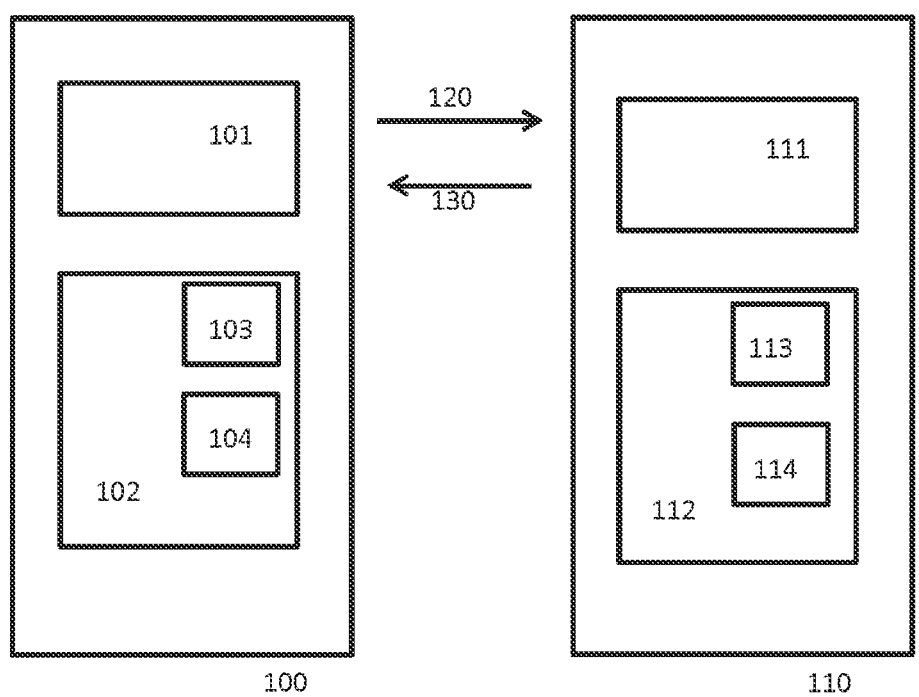
FIG. 1 shows a schematic representation of two communication devices embodying concepts of the present disclosure.

FIG. 1 shows a system comprising a communication device 100 arranged for sending data units 120, e.g., Protocol Data Units (PDUs) associated with a predetermined communication protocol, e.g. PDCP, to a further communication device 110 arranged for receiving the data units 120.

Communication device 100 may be comprised in a network node of a communication network or may be such a node, e.g., an access node of a wireless communication system, like a base station. According to an embodiment, device 100 is comprised in an eNodeB. Device 100 comprises an interface 101, e.g., adapted for wireless transmission and reception, and a control part 102, which in turn may comprise a processor 103 and a memory 104.

Communication device 110 may be a part of the same communication network, e.g., mobile station of a wireless communication system. According to an embodiment, device 110 is a User Equipment (UE) of a wireless communication system, e.g. LTE. Device 110 comprises an interface 111, e.g., adapted for wireless transmission and reception, and a control part 112, which in turn may comprise a processor 113 and a memory 114.

According to an embodiment, communication device 110 is arranged for receiving the data units 120 and configurable for periodic receipt status reporting, i.e., sending receipt status reports 130 that provide information on the receipt status of the sent data units 120. For example, sequence numbers (SN) may be used for distinguishing individual data units, and the receipt status reports may provide information on the receipt status using such SNs. The receipt status information may be chosen in any suitable or desirable way, e.g., distinguish states such as "received" or "missing".

At least a first type of receipt status report and a second type receipt status report are provided. In the following, only two types of status reports will be referred to, but the invention is not limited to two and can also be applied in the case of more than two types of status report. According to the embodiment, device 110 is configurable for periodic receipt status reporting by associating a first status report type with a value of a first reporting periodicity parameter and associating a second status report type with a value of second reporting periodicity parameter. The first status report type is different from said second status report type and the first reporting periodicity parameter is different from the second reporting periodicity parameter.

The configuration of device 110 can be done in any suitable or desirable way, e.g., by providing to communication device 110 a configuration information element comprising information for associating a first status report type with a value of a first reporting periodicity parameter and associating a second status report type with a value of second reporting periodicity parameter, said first status report type being different from said second status report type and said first reporting periodicity parameter being different from said second reporting periodicity parameter. Such a configuration information element can e.g., be provided from device 100 to device 110 some time prior to starting the sending of data units 120. However, it could also be provided by some other source within or outside of the communication network of the devices 100 and 110.

Preferably, in response to being configured, and when receiving data units 120, the device 110 then periodically sends receipt status reports of the first type according to said associated value of said first reporting periodicity parameter and receipt status reports of said second type according to said associated value of said second reporting periodicity parameter.

The reporting periodicity parameter can be chosen in any suitable or desirable way. For example, it can be chosen to express a time period, e.g., indicated in milliseconds, said time period indicating the time interval between consecutive transmissions of the corresponding receipt status reports. However, the reporting periodicity can equally well be chosen to express a frequency, e.g., indicated in 1/s, said frequency indicating the frequency of repetition of the corresponding receipt status reports.

In accordance with the embodiment, instead of allowing choosing only one type of receipt status report and then sending the chosen type at a given periodicity, the described concept allows sending two different types of receipt status report in parallel, each with their own respective periodicity. This provides a significant increase in flexibility and introduces a further degree of freedom for operation.

For example, the first status report type may be associated with a first report size and the second status report type may be associated with a second report size, the first report size being larger than the second report size. In other words, the first report type may comprise more status information than the second report type. According to the embodiment, it becomes possible to set the associated value of the first reporting periodicity parameter larger than the associated value of the second reporting periodicity parameter, i.e. the large amount of status information per report, which is important for transmission control of data units 120 from time to time but consumes significant transmission resources, is sent less frequently than the smaller amount of status information per report, which might often be completely sufficient for proper transmission control of the data units 120 being sent, thereby achieving a good balance between reporting efficiency and resource consumption.

As an example, the receipt status report of the first type may comprise an indication of a first missing PDU, the first missing PDU being the PDU with lowest Sequence Number that is missing, and a bitmap indicating further missing PDUs between the first missing PDU and a received PDU with the highest sequence number. The receipt status report of the second type may also comprise an indication of the first missing PDU, but not the bitmap.

It is noted that although the first reporting periodicity parameter is different (i.e. independent of) from said second reporting periodicity parameter, the values configured for the two periodicities can be the same. However, if the values are configured to be different, one advantageous embodiment comprises choosing the value of the first reporting periodicity parameter as an integer multiple of the value of the second reporting periodicity parameter, as this allows for reduced signaling.

The operation of controlling the periodic transmission of the receipt status reports can be performed in any suitable or desirable way. For example, it may comprise using a first timer for controlling the sending of receipt status reports of the first type and a second timer for controlling the sending of receipt status reports of the second type. The two timers could be started simultaneously after configuration, but according to a preferred embodiment, the first timer and said second timer are initially started with a predetermined offset. The offset is preferably chosen such that the triggering of the sending of the first type receipt status report does not coincide with the triggering of the second type receipt status report. The offset may be preset, or it can equally be part of the configuration operation of the device 110, e.g. performed with the configuration information element sent by device 100. As an example, if the value configured for the first reporting periodicity is 200 ms and the value configured for the second reporting periodicity is 50 ms, the offset may e.g. be configured to 25 ms.

The control operation may be such that it comprises:
determining that said first timer has reached a triggering condition (e.g., when the timer has expired),
sending a receipt status report of said first type, and
restarting said first timer.

The control operation may furthermore be such that it comprises:
determining that said second timer has reached a triggering condition (e.g., when the timer has expired),
sending a receipt status report of said second type, and
restarting said second timer.

According to another embodiment, the device 110 may be arranged to receive messages requesting sending of a receipt status report, e.g., a polling request. Such messages requesting sending of a receipt status report can e.g., be sent by device 100.

The control operation may then furthermore be such that it comprises:

receiving a message requesting sending of a receipt status report of said first type, sending a receipt status report of said first type, and restarting said first timer. The control operation may be such that only the first timer is restarted, but it is also possible that both the first and the second timer are restarted. If both timers are to be restarted, one is preferably restarted with a predetermined offset with respect to the other. This offset can be chosen to be the same as described above for the initial start, or it can be chosen to be different. Preferably, an offset is configured (e.g., by an information element sent from device 100 to device 110), and the same offset is used for the initial start of both timers and for the restarting of both timers.

The control operation may furthermore be such that it comprises:

receiving a message requesting sending of a receipt status report of said second type, sending a receipt status report of said second type, and restarting said second timer. The control operation may be such that only the second timer is restarted, but it is also possible that both the first and the second timer are restarted. If both timers are to be restarted, one is preferably restarted with a predetermined offset with respect to the other. This offset can be chosen to be the same as described above for the initial start, or it can be chosen to be different. Preferably, an offset is configured (e.g., by an information element sent from device 100 to device 110), and the same offset is used for the initial start of both timers and for the restarting of both timers.

As described above, the presently described concept allows sending two different kinds of receipt status reports in parallel, each with an independently configurable periodicity. In order to more efficiently use the transmission resources, the operation may be controlled in such a way that it comprises sending only one of the first and the second type receipt status reports within a predetermined time period from one another. For example, this time period may be a transmission timing interval (TTI), such that the method comprises sending only one of the first and the second type receipt status reports within the same transmission timing interval. However, the time period can also be set longer, e.g. a plurality of TTIs.

The presently described concepts may also be embodied as a computer program product comprising program code to be executed by a processor (e.g. processor 113) of a communication device like device 110 to perform a method according to any of the above described method embodiments.

The presently described concepts may also be embodied as a computer program product comprising program code to be executed by a processor (e.g. processor 103) of a communication network node like device 100 to perform a method according to any of the above described method embodiments.

In the following, further examples of the above described concepts will be described in a more detailed context. This only serves to better illustrate the concepts, but is not intended to be limiting.

The present examples will be described within the context of integration of LTE and WLAN. It should, however, be understood that the problems and solutions described herein are equally applicable to wireless access networks and user equipments (UEs) implementing other access technologies and standards. LTE and WLAN are used as example technologies where the invention is suitable and using LTE and WLAN in the description therefore is particularly useful for understanding the problem and solutions solving the problem.

LTE-WLAN aggregation (LWA) is a feature wherein the UE may receive and transmit using links to both eNB and WLAN. This feature is described by 3GPP in Release 13 as part of RP-150510 revised in RP-151114. There are different architecture options for LTE-WLAN aggregation. In the split bearer architecture option, denoted also by option 3C, data is split in the PDCP layer. For the downlink direction, this split is done in the eNB. The eNB may dynamically decide how to route PDCP PDUs to the UE—either to the UE directly using LTE RLC, LTE MAC, and LTE PHY, or via a backhaul channel to WLAN and then to the UE using 802.11 MAC and 802.11 PHY.

Figure 2:
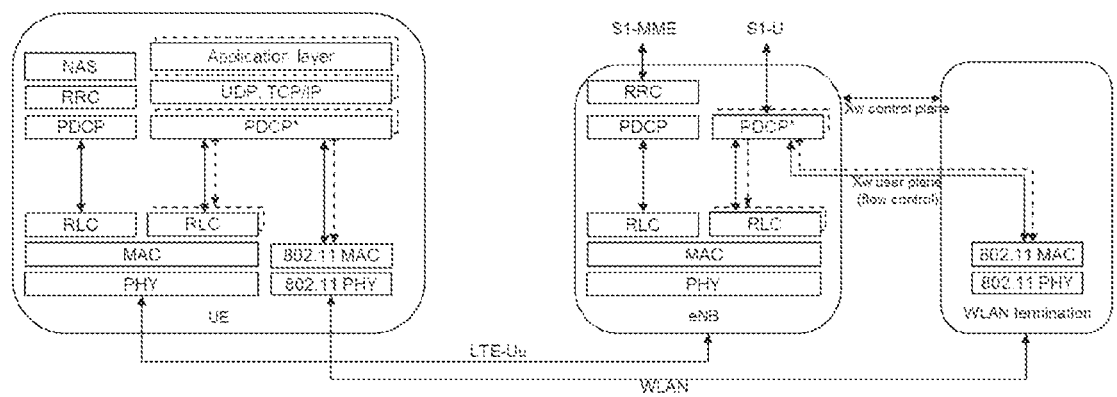
FIG. 2 shows an example of protocol architecture of LTE-ALAN aggregation.
Figure 3:
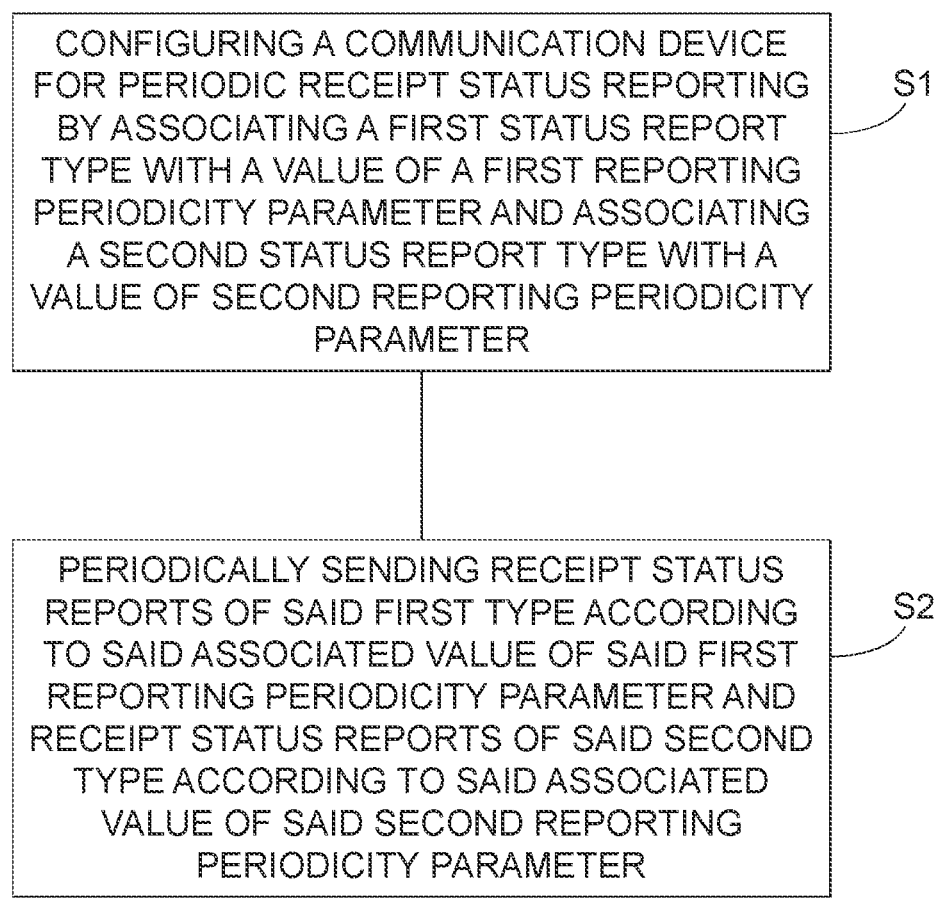
FIG. 3 shows a first embodiment of method steps according to the present disclosure.
Figure 4:
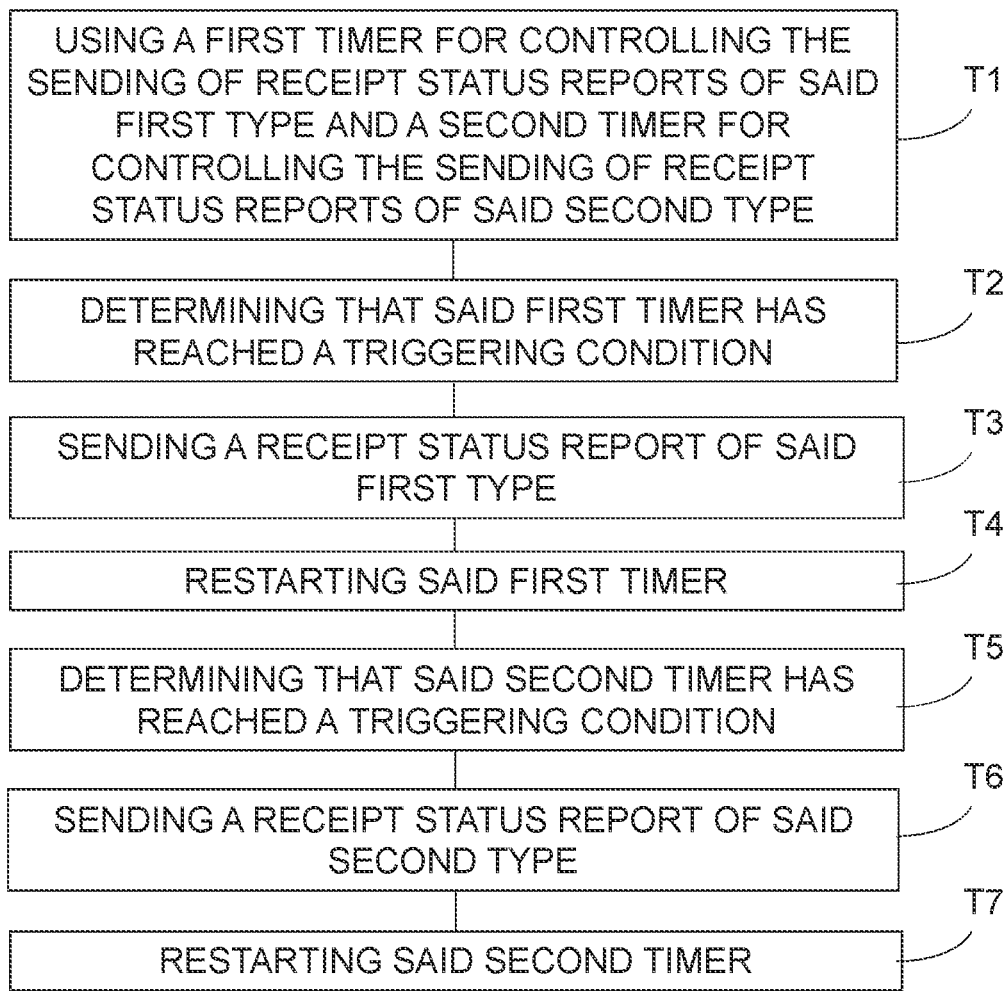
FIG. 4 shows a second embodiment of method steps according to the present disclosure.
Figure 5:
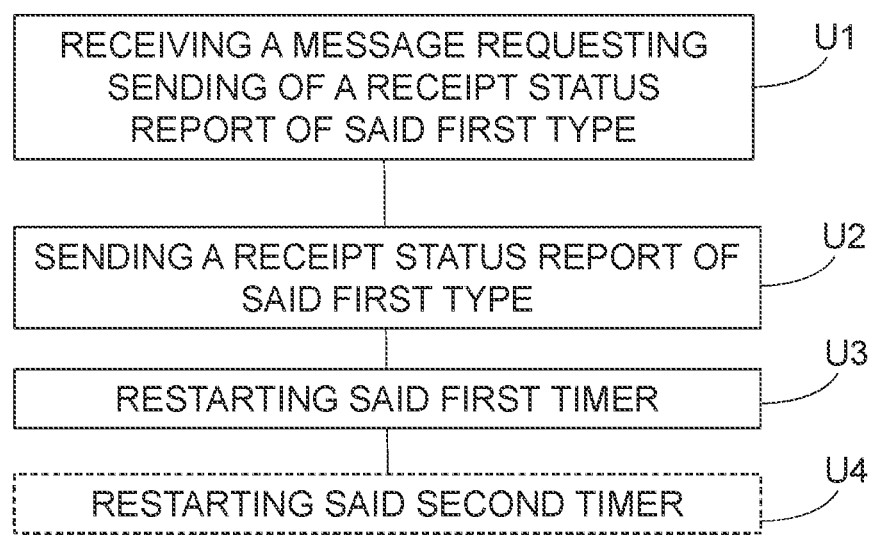
FIG. 5 shows a third embodiment of method steps according to the present disclosure.
Figure 6:
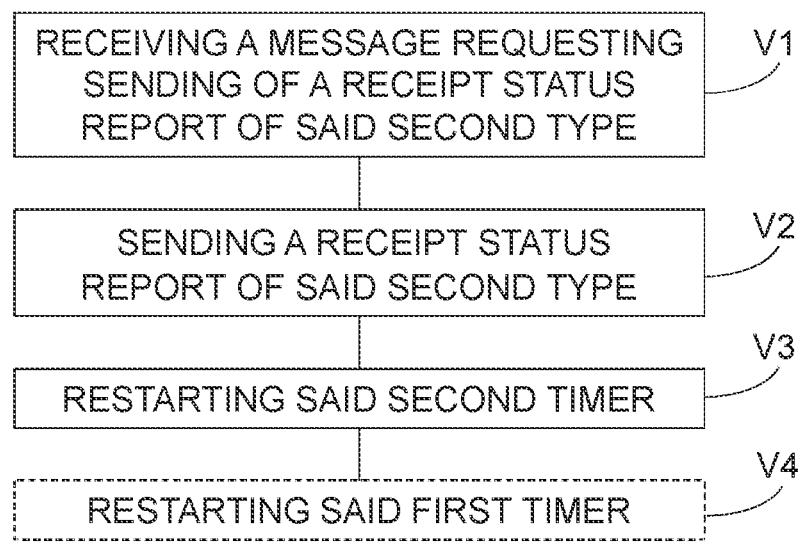
FIG. 6 shows a fourth embodiment of method steps according to the present disclosure.
Figure 8:
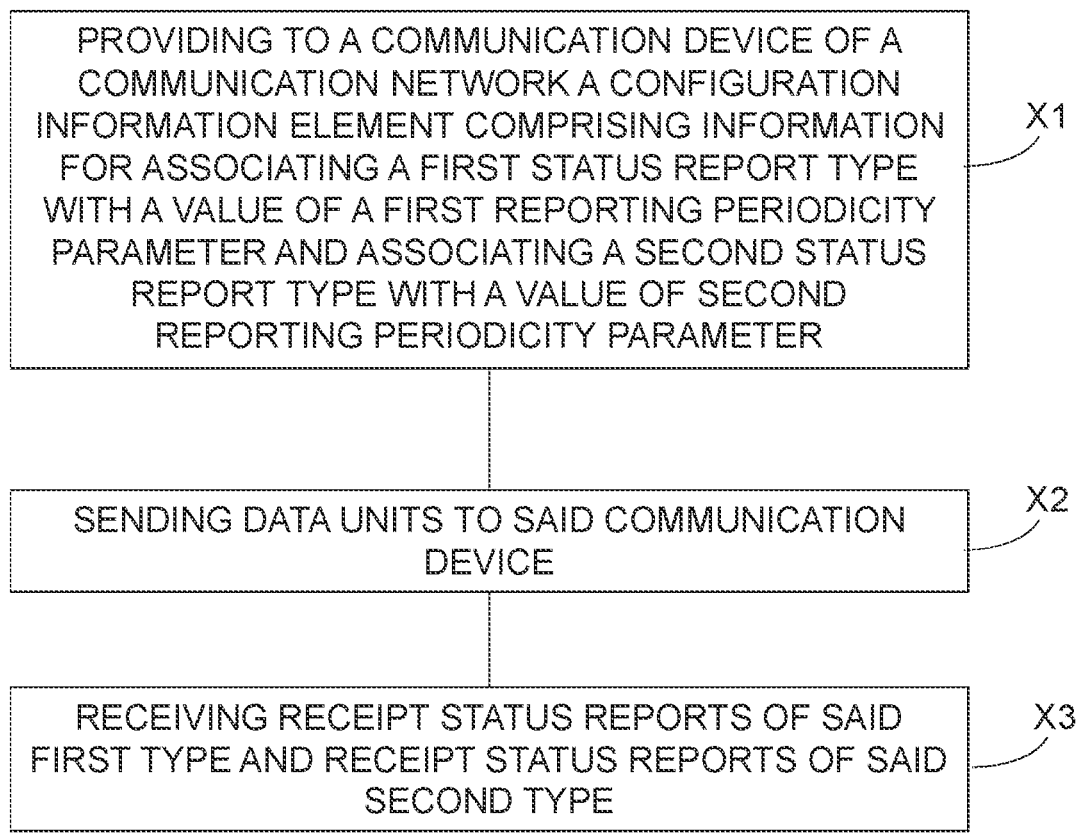
FIG. 8 shows a sixth embodiment of method steps according to the present disclosure.

FIG. 2 shows the envisaged protocol architecture for LTE-WLAN aggregation. The WLAN termination (WT) point in the network may be implemented by an WLAN access point (AP) and/or access controller (AC) or a further network node. The interface protocol between eNB and WT is denoted Xw.

A current working assumption in 3GPP RAN2 is to introduce a new PDCP status report format, which may be used periodically or based on polling by the eNB. With the PDCP status reporting, generally, the UE informs the eNB about PDCP reception status in the UE.

The legacy report contains a field for first missing sequence (FMS) number which is set to the first missing PDCP SDU and a bitmap field of length in bits equal to the number of PDCP SNs from and not including the first missing PDCP SDU up to and including the last out-of-sequence PDCP SDUs, rounded up to the next multiple of 8. In the following it is explained how FMS and bitmap can be used by the eNB:

FMS: With the FMS field the eNB knows how much data is in flight, i.e. in transmission and in reordering processes between eNB and UE PDCP. This information is useful so that the eNB limits its transmissions and does not bring more than ½ PDCP SN space in flight. Furthermore, an average PDCP reception rate can be estimated by comparing how the FMS fields progresses between subsequent reports. Since also the RLC (LTE) reception rate is known in the eNB (based on RLC feedback), the eNB can estimate a WLAN reception rate as well. Similarly the eNB can estimate the data in flight on WLAN link (=data sent−FMS+1−data sent but not received via LTE RLC). Both these information pieces may be useful for the eNB for flow control and multipath scheduling (LTE or WLAN) of PDCP data.

The bitmap: Already with only knowing FMS, after a handover in LTE single connectivity, the eNB was able to do PDCP retransmissions (of all data between highest SN sent and EMS). Some of the data may have already been received by the UE however, due to RLC out of order delivery after handover. For that the bitmap was introduced: it indicates exactly which SN is still outstanding and which SN is already received. Selective retransmissions are enabled by the bitmap. If also in LWA selective retransmissions on PDCP level are considered, the bitmap is useful (or a list of missing SNs below a highest out of order received SN, but this could lead to higher overhead than the bitmap). These selective PDCP retransmissions can be done e.g. when a PDU was lost on WLAN. Recovering this gap by LTE PDCP can improve the end-user performance. It may be up to eNB implementation if such retransmissions are done.

The maximum size of the bitmap is ½ of the SN space. For 15 bit SN the maximum size is thus 2 KB. For a Cat5 UE with a maximum theoretical UL rate of 75376 bit/TTI, this would lead to an overhead of 21% within this TTI, which is quite considerable, thus frequency feedback including the bitmap is preferably be avoided.

With the method outlined in the present document it is possible to configure a UE with two different PDCP status reporting formats for periodic reporting. Reporting based on the different formats can have different periodicities and time-offsets to start the periodic reporting. This enables the eNB to receive a detailed PDCP status report less frequently, which avoids uplink overhead, but still a less-detailed PDCP status report very frequently. The detailed PDCP status report may use the legacy PDCP status report format, and the frequent PDPC status report may use a new format, e.g. only including EMS.

The novel concepts allow more efficient PDCP status reporting. The concepts allow using the advantages of utilizing two different status report formats. Typically, one of them is more resource efficient and thus has less uplink overhead, while another format is more detailed and can enable e.g., selective retransmissions of missing data units, but it uses more UL radio resources.

In one embodiment the UE is configured to do PDCP status reporting periodically, based on two different PDCP status report formats with two different configurable periodicities. It should be appreciated though that more than two formats (and more than two periodicities) may be used, but herein as an example it is assumed that two formats are used.

In one embodiment the first periodicity is a multiple of the other periodicity. This allows for reduced signaling.

A less-frequent reporting may be configured for a detailed PDCP status report format, e.g., the legacy PDCP status report format including FMS and a bitmap.

A more-frequent reporting may be configured for a less-detailed PDCP status report format, e.g., a new format, which may only be based on FMS.

In other words, in one embodiment, two different periodicities may be configured for periodic PDCP status reporting, one period to report FMS and a bitmap, and another period to leave out the bitmap from the report, i.e. only FMS.

In one embodiment the UE would drop the transmission of a format with less information (e.g. FMS only) if a format with more information (e.g. legacy format, i.e. FMS and bitmap) is sent at the same time, e.g. in the same TTI.

In one embodiment two different timers (e.g. called t-StatusReportType1 and t-StatusReportType2 and as described in more detail further on in the present document) are used in the UE's PDCP implementation to handling the timing of the transmissions of the status reports based on the different formats.

In another embodiment the UE is configured with a timing offset between the starting points of the periodical reporting of the two formats. For example if one timer is already running and started at a time t1, the second timer is started at time t2=t1+offset.

In one embodiment the UE restarts the periodic timer upon transmitting a PDCP report which was triggered by eNB polling. In one version of this embodiment the UE would only restart the periodic timer for the type of report which was polled. For example if the eNB has configured the UE to send a periodic report with FMS+bitmap every 100 ms and also configured the UE to send a periodic report with only FMS every 50 ms, and the eNB polls the UE to get a report with FMS+bitmap, then the UE would restart the timer used to determine when to send the report with FMS+bitmap (but not the timer to determine when to send the report with only EMS). Alternatively, the UE may restart all periodic timers when any report is polled, i.e. in the example provided here above, the UE would then restart both the tinier used to determine when to send the report with FMS+bitmap and the timer used to determine when to send the report with only EMS.

In the following an example of a configuration information element is given, more specifically a radio resource control (RHO) configuration message, where the novel concept of two independent reporting periodicity parameters is highlighted:

```
PDCP-Config : : =                      SEQUENCE {
    discardTimer                           ENUMERATED {
                                               ms50, ms100, ms150, ms300, ms500,
                                               ms750, ms1500, infinity
                                                                    OPTIONAL,
    }
-- Cond Setup
    rlc-AM                                 SEQUENCE {
        statusReportRequired                   BOOLEAN
    }                                                               OPTIONAL,
-- Cond Rlc-AM
    rlc-UM                                 SEQUENCE {
        pdcp-SN-Size                           ENUMERATED {len7bits, len12bits}
    }                                                               OPTIONAL,
-- Cond Rlc-UM
    headerCompression                      CHOICE {
        notUsed                                NULL,
        rohc                                   SEQUENCE {
            maxCID                                 INTEGER
    (1 . . 1683)               DEFAULT 15,
            profiles                               SEQUENCE {
                profile0x0001                          BOOLEAN,
                profile0x0002                          BOOLEAN,
                profile0x0003                          BOOLEAN,
                profile0x0004                          BOOLEAN,
                profile0x0006                          BOOLEAN,
                profile0x0101                          BOOLEAN,
                profile0x0102                          BOOLEAN,
                profile0x0103                          BOOLEAN,
                profile0x0104                          BOOLEAN
```

```
        },
      ...
      }
    },
    ...,
    [ [ rn-integrityProtection-r10           ENUMERATED {enabled} OPTIONAL --
Cond RN
    ] ],
    [ [ pdcp-SN-Size-v1130                   ENUMERATED {len15bits} OPTIONAL --
Cond Rlc-AM2
    ] ],
    [ [ ul-DataSplitDPB-ViaSCG-r12           BOOLEAN OPTIONAL, -- Need ON
        t-Reordering-r12                     ENUMERATED {
                                               ms0, ms20, ms40, ms60, ms80, ms100,
ms120, ms140,
                                               ms160, ms180, ms200, ms220, ms240,
ms260, ms280, ms300,
                                               ms500, ms750, spare14, spare13, spare12,
spare11, spare10,
                                               spare9, spare8, spare7, spare6, spare5,
spare4, spare3,
                                               spare2,
spare1}                  OPTIONAL            -- Cond SetupS
    ] ],
    [ [ statusFeedbackRequired-r13           BOOLEAN OPTIONAL, -- Need ON
        statusPDU-TypeForPolling-r13         ENUMERATED {type1,
type2} OPTIONAL,
        statusPDU-PeriodicityType1-r13       ENUMERATED {ms50, ms100, ms150,
ms200, ms300, ms500, ms1000, ms2000, ms5000, ms10000, ms20000, ms50000,
                                             spare4, spare3, spare2,
spare1} OPTIONAL
        statusPDU-PeriodicityType2-r13       ENUMERATED {ms50, ms100, ms150,
ms200, ms300, ms500, ms1000, ms2000, ms5000, ms10000, ms20000, ms50000,
                                             spare4, spare3, spare2,
spare1} OPTIONAL
    ] ]
}
```

Furthermore, in the following an example of specifying the control in accordance with the two timers is provided, where the LWA status report is an example of a receipt status report:

When t-StatusReportType1 expires (if configured), the UE shall:
  if the LWA bearer is configured by upper layers to send a PDCP status report in the uplink (statusFeedback [3]):
  compile and transmit the PDCP status report of type 1, i.e., legacy PDCP status report, as specified in subclause 5.3.1;
  start t-StatusReportType1.

When t-StatusReportType2 expires (if configured), the UE shall:
  if the LWA bearer is configured by upper layers to send a PDCP status report in the uplink (statusFeedback [3]):
  compile and transmit the PDCP status report of type 2, i.e., LWA PDCP status report, as specified in sub-clause 5.x.1;
  start t-StatusReportType2.

When the value of the t-StatusReportType1 is configured or reconfigured by upper layers, the UE shall:
  if t-StatusReportType1 is running:
  stop and restart t-StatusReportType1;
  if t-StatusReportType1 is not running:
  start t-StatusReportType1;

When the value of the t-StatusReportType2 is configured or reconfigured by upper layers, the UE shall:
  if t-StatusReportType2 is running:
  stop and restart t-StatusReportType2;
  if t-StatusReportType2 is not running:
  start t-StatusReportType2;
  Timer Description:
b) t-StatusReportType1
The duration of the timer is configured by upper layers (statusPDU-PeriodicityType1 [3]). When configured, this timer is used to trigger status report transmission of type1 for LWA as specified in the subclause 5.x.
C) t-StatusReportType2
The duration of the timer is configured by upper layers (statusPDU-PeriodicityType2 [3]). When configured, this timer is used to trigger status report transmission of type2 for LWA as specified in the subclause 5.x.

It may be noted that a timing offset configuration is not included in the previous example.

In the following, an example including a timing offset configuration is given.

```
-- ASN1START
PDCP-Config ::=            SEQUENCE {
    discardTimer           ENUMERATED {
                               ms50, ms100, ms150, ms300, ms500,
                               ms750, ms1500, infinity
    }                                                OPTIONAL,   -- Cond
Setup
    rlc-AM                 SEQUENCE {
```

```
      statusReportRequired        BOOLEAN
   }                                           OPTIONAL,          -- Cond
Rlc-AM
   rlc-UM                          SEQUENCE {
      pdcp-SN-Size                 ENUMERATED {len7bits, len12bits}
   }                                           OPTIONAL,          -- Cond
Rlc-UM
   headerCompression               CHOICE {
      notUsed                      NULL,
      rohc                         SEQUENCE {
         maxCID                    INTEGER (1 .. 16383)            DEFAULT
15,
         profiles                  SEQUENCE {
            profile0x0001          BOOLEAN,
            profile0x0002          BOOLEAN,
            profile0x0003          BOOLEAN,
            profile0x0004          BOOLEAN,
            profile0x0006          BOOLEAN,
            profile0x0101          BOOLEAN,
            profile0x0102          BOOLEAN,
            profile0x0103          BOOLEAN,
            profile0x0104          BOOLEAN
         },
         ...
      }
   },
   ...,
   [[ rn-IntegrityProtection-r10   ENUMERATED {enabled} OPTIONAL -- Cond
RN
   ]],
   [[ pdcp-SN-Size-v1130           ENUMERATED {len15bits} OPTIONAL -- Cond
Rlc-AM2
   ]],
   [[ ul-DataSplitDRB-ViaSCG-r12   BOOLEAN OPTIONAL, -- Need ON
      t-Reordering-r12             ENUMERATED {
                                   ms0, ms20, ms40, ms60, ms80, ms100, ms120,
ms140,
                                   ms160, ms180, ms200, ms220, ms240, ms260,
ms280, ms300,
                                   ms500, ms750, spare14, spare13, spare12,
spare11, spare10,
                                   spare9, spare8, spare7, spare6, spare5,
spare4, spare3,
                                   spare2, spare1}         OPTIONAL -- Cond
SetupS
   ]],
   [[ ul-DataSplitThresholde-r13   CHOICE {
         release                   NULL,
         setup                     ENUMERATED {
                                   b0, b100, b200, b400, b800, b1600, b3200,
b6400, b12800,
                                   b25600, b51200, b102400, b204800, h409600,
b819200,
                                   spare1}
      }                                        OPTIONAL, -- Need ON
      pdcp-SN-Size-v13xx           ENUMERATED {len18bits} OPTIONAL, -- Cond
Rlc-AM3
      statusFeedback               CHOICE {
         release                   NULL,
         setup                     SEQUENCE {
            statusPDU-TypeForPolling-r13 ENUMERATED {type1, type2}
OPTIONAL,
            statusPDU-TypeForPeriodic-r13 ENUMERATED {type1, type2}
OPTIONAL,            statusPDU Periodicity-Type1-r13 ENUMERATED
{ms50, ms100, ms150, ms200, ms300, ms500,
                                   ms1000, ms2000, ms5000, ms10000,
ms20000, ms50000,
                                   spare4, spare3, spare2, spare1}
                                   OPTIONAL
            statusPDU-Periodicity-Type2-r13 ENUMERATED {ms50, ms100,
ms150, ms200, ms300, ms500,
                                   ms1000, ms2000, ms5000, ms10000,
ms20000, ms50000,
                                   spare4, spare 3, spare2, spare1}
                                   OPTIONAL,
            statusPDU-PeriodOffset-r13 ENUMERATED {ms50, ms100,
ms150, ms200, ms300, ms500,
                                   ms1000, ms2000, ms5000, ms10000,
```

```
ms20000, spare5,
                                    spare4, spare3, spare2, spare1}
                                        OPTIONAL -- Cond Lwa-
                                        TwoPeriodicReports
        }
    }                                                                   OPTIONAL, -- Need ON
  ]]
}
-- ASN1STOP
```

As can be seen, a field "statusPDU-PeriodOffset" has been added to the information element.

The specification of the control for the timers can then be amended as follows:

When the value of the t-StatusReportType1 or t-StatusReportType2 is configured or reconfigured by upper layers, the UE shall:
  if t-StatusReportType1 is running:
  stop and restart t-StatusReportType1;
  if t-StatusReportType1 is not running:
  start t-StatusReportType1;
  if t-StatusReportType2 is running:
  stop and restart t-StatusReportType2 after the timing offset statusPDU-PeriodOffset if configured [3] compared to the start of t-StatusReportType1;
  if t-StatusReportType2 is not running:
  start t-StatusReportType2 after the timing offset statusPDU-PeriodOffset if configured [3] compared to the start of t-StatusReportType1;

What is claimed is:

1. A method of receipt status reporting in a communication device, comprising
  starting a first timer for a periodic Packet Data Conveyance Protocol (PDCP) status report of a first status report type, wherein a value of the first timer is set according to a first periodicity parameter associated with the first status report type;
  upon expiration of the first timer, compiling and sending a PDCP status report of the first type;
  starting a second timer for a periodic PDCP status report of a second status report type different than the first status report type, wherein a value of the second timer is set according to a second periodicity parameter associated with the second status report type; and
  upon expiration of the second timer, compiling and sending a PDCP status report of the second type.

2. The method of claim 1, wherein a first status report type comprises a sequence number of a first missing data unit and a bitmap indicating missing data units following the first missing data unit.

3. The method of claim 2, wherein the second status report type comprises a sequence number of a first missing data unit without the bitmap indicating missing data units following the first missing data unit.

4. The method of claim 3, wherein:
  a size of the first status report type is greater than a size of the second status report type; and
  wherein a first reporting period indicated by the first periodicity parameter is greater than a second reporting period indicated by the second periodicity parameter.

5. The method of claim 1, wherein a value of first periodicity parameter is an integer multiple of a value of said second periodicity parameter.

6. The method of 1, further comprising sending only one of said first and said second type receipt status reports within a predetermined time period from one another.

7. The method of claim 1, further comprising sending only one of said first and said second type receipt status reports within the same transmission timing interval.

8. The method of claim 1, wherein said communication device is furthermore configured for LTE-WLAN aggregation.

9. The method of claim 1, wherein said communication device comprises a radio access network node.

10. The method of claim 1, wherein said communication device comprises a user equipment.

11. A communication device in a wireless communication network, the communication device being configured for receipt status reporting and comprising
  interface circuitry configured for wireless transmission and reception;
  processing circuitry configured to:
    start a first timer for a periodic Packet Data Conveyance Protocol (PDCP) status report of a first status report type, wherein a value of the first timer is set according to a first periodicity parameter associated with the first status report type;
    upon expiration of the first timer, compile and send a PDCP status report of the first type;
    start a second timer for a periodic PDCP status report of a second status report type different than the first status report type, wherein the value of the second timer is set according to a second periodicity parameter associated with the second status report type; and
    upon expiration of the second timer, compile and send a PDCP status report of the second type.

12. The communication device of claim 11, wherein the first status report type comprises a sequence number of a first missing data unit and a bitmap indicating missing data units following the first missing data unit.

13. The communication device of claim 12, wherein the second status report type comprises a sequence number of a first missing data unit without the bitmap indicating missing data units following the first missing data unit.

14. The communication device of claim 13, wherein:
  a size of the first status report type is greater than a size of the second status report type; and
  wherein a first reporting period indicated by the first periodicity parameter is greater than a second reporting period indicated by the second periodicity parameter.

15. The communication device of claim 11, wherein a value of first periodicity parameter is an integer multiple of a value of said second periodicity parameter.

16. The communication device of 11, comprising sending only one of said first and said second type receipt status reports within a predetermined time period from one another.

17. The communication device of claim 11, comprising sending only one of said first and said second type receipt status reports within the same transmission timing interval.

18. The communication device of claim 11, wherein said communication device is furthermore configured for LTE-WLAN aggregation.

19. The communication device of claim 11, wherein the communication device comprises a radio access network node.

20. The communication device of claim 11, wherein the communication device comprises a user equipment.

\* \* \* \* \*

UNITED STATES PATENT AND TRADEMARK OFFICE
CERTIFICATE OF CORRECTION

PATENT NO. : 11,575,475 B2
APPLICATION NO. : 17/365638
DATED : February 7, 2023
INVENTOR(S) : Dudda et al.

It is certified that error appears in the above-identified patent and that said Letters Patent is hereby corrected as shown below:

In the Specification

In Column 1, Line 8, delete "2017," and insert -- 2017, now U.S. Pat. no. 11,070,324, --, therefor.

In Column 2, Line 34, delete "LTE-ALAN" and insert -- LTE-WLAN --, therefor.

In Column 3, Line 16, delete "type" and insert -- type of --, therefor.

In Column 4, Line 43, delete "type" and insert -- type of --, therefor.

In Column 4, Line 44, delete "type" and insert -- type of --, therefor.

In Column 5, Line 40, delete "type" and insert -- type of --, therefor.

In Column 5, Line 44, delete "type" and insert -- type of --, therefor.

In Column 6, Line 20, delete "(WI)" and insert -- (WT) --, therefor.

In Column 6, Line 55, delete "EMS)." and insert -- FMS). --, therefor.

In Column 7, Line 17, delete "EMS." and insert -- FMS. --, therefor.

In Column 8, Line 30, delete "EMS)." and insert -- FMS). --, therefor.

In Column 8, Line 33, delete "tinier" and insert -- timer --, therefor.

In Column 8, Line 35, delete "EMS." and insert -- FMS. --, therefor.

In Column 8, Line 38, delete "(RHO)" and insert -- (RRC) --, therefor.

Signed and Sealed this
Tenth Day of October, 2023

Katherine Kelly Vidal
*Director of the United States Patent and Trademark Office*

CERTIFICATE OF CORRECTION (continued)
U.S. Pat. No. 11,575,475 B2

In Columns 7 & 8, in Table, Line 20, delete "(1 . . 1683)" and insert -- (1 . . 16383) --, therefor.

In Columns 9 & 10, in Table, Line 6, delete "[ [ rn-integrityProtection-r10" and insert -- [[ rn-IntegrityProtection-r10 --, therefor.

In Columns 9 & 10, in Table, Line 12, delete "[ [ ul-DataSplitDPB-ViaSCG-r12" and insert -- [ [ ul-DataSplitDRB-ViaSCG-r12 --, therefor.

In Column 10, Line 45, delete "b)" and insert -- a) --, therefor.

In Column 10, Line 50, delete "C)" and insert -- c) --, therefor.

In Columns 9 & 10, in Table, Line 1, delete "-- ASNISTART" and insert -- -- ASN1START --, therefor.

In Columns 11 & 12, in Table-continued, Line 47, delete "[ [ ul-DataSplitThresholde-r13" and insert -- [ [ ul-DataSplitThreshold-r13 --, therefor.

In Columns 11 & 12, in Table-continued, Line 52, delete "h409600," and insert -- b409600, --, therefor.

In Columns 11 & 12, in Table-continued, Line 64, delete "statusPDU Periodicity-Type1-r13" and insert -- statusPDU-Periodicity-Type1-r13 --, therefor.

In Columns 11 & 12, in Table-continued, Line 74, delete "spare 3," and insert -- spare3, --, therefor.

In Columns 13 & 14, in Table-continued, Line 6, delete "OPTIONAL," and insert -- OPTIONAL --, therefor.

In the Claims

In Column 13, Lines 37-38, in Claim 1, delete "Conveyance" and insert -- Convergence --, therefor.

In Column 14, Line 13, in Claim 6, delete "of 1," and insert -- of claim 1, --, therefor.

In Column 14, Line 14, in Claim 6, delete "type" and insert -- type of --, therefor.

In Column 14, Line 17, in Claim 7, delete "type" and insert -- type of --, therefor.

In Column 14, Lines 32-33, in Claim 11, delete "Conveyance" and insert -- Convergence --, therefor.

In Column 14, Line 64, in Claim 16, delete "of 11," and insert -- of claim 11, --, therefor.

In Column 14, Line 65, in Claim 16, delete "type" and insert -- type of --, therefor.

In Column 15, Line 2, in Claim 17, delete "type" and insert -- type of --, therefor.